United States Patent
Beyda

(10) Patent No.: US 7,603,412 B2
(45) Date of Patent: Oct. 13, 2009

(54) SYSTEM AND METHOD FOR COLLABORATING USING INSTANT MESSAGING IN MULTIMEDIA TELEPHONY-OVER-LAN CONFERENCES

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 648 days.

(21) Appl. No.: 10/174,031

(22) Filed: Jun. 17, 2002

(65) Prior Publication Data

US 2003/0233416 A1    Dec. 18, 2003

(51) Int. Cl.
 G06F 15/18    (2006.01)
(52) U.S. Cl. ..................... 709/204; 709/207
(58) Field of Classification Search .......... 709/203, 709/204, 207; 379/202.01
See application file for complete search history.

(56) References Cited

U.S. PATENT DOCUMENTS

| 5,617,539 | A | 4/1997 | Ludwig et al. |
| 5,857,189 | A | 1/1999 | Riddle |
| 5,951,694 | A | 9/1999 | Choquier et al. |
| 5,995,594 | A | 11/1999 | Shaffer et al. |
| 6,078,948 | A | 6/2000 | Podgorny |
| 6,226,678 | B1 * | 5/2001 | Mattaway et al. ........... 709/230 |
| 6,363,352 | B1 * | 3/2002 | Dailey et al. ................... 705/9 |
| 6,373,817 | B1 * | 4/2002 | Kung et al. ................. 370/217 |
| 6,411,605 | B1 * | 6/2002 | Vance et al. ................. 370/261 |
| 6,493,324 | B1 | 12/2002 | Truetken |
| 6,535,238 | B1 | 3/2003 | Kressin |
| 6,628,767 | B1 * | 9/2003 | Wellner et al. ......... 379/202.01 |
| 6,629,129 | B1 * | 9/2003 | Bookspan et al. ........... 709/204 |
| 6,678,735 | B1 | 1/2004 | Orton |

(Continued)

OTHER PUBLICATIONS

Spiderphone.com, "Frequently Asked Questions", Feb. 29, 2000, available at http://web.archive.org/web/20000229202145/www.spiderphone.com/About/FAQ.asp.*

(Continued)

Primary Examiner—Aaron Strange

(57) ABSTRACT

A telecommunications system according to an embodiment of the present invention includes an instant messaging (IM) server and a VoIP server; and a plurality of system clients having both VoIP and IM sub-clients. The system clients can log on to their respective servers in parallel. The IM server and the VoIP server can communicate lists of common participants and allow for IM conferences among at least subsets of the system clients while an audio or video teleconference is ongoing.

20 Claims, 6 Drawing Sheets

U.S. PATENT DOCUMENTS

| | | | |
|---|---|---|---|
| 6,757,732 B1* | 6/2004 | Sollee et al. | 709/227 |
| 6,778,661 B1* | 8/2004 | Yumoto et al. | 379/265.09 |
| 6,791,583 B2* | 9/2004 | Tang et al. | 715/751 |
| 6,870,830 B1 | 3/2005 | Schuster et al. | |
| 6,910,187 B2 | 6/2005 | Felkey et al. | |
| 6,981,223 B2 | 12/2005 | Becker et al. | |
| 6,982,973 B2 | 1/2006 | Truetken | |
| 6,983,305 B2 | 1/2006 | Danker et al. | |
| 7,031,268 B1 | 4/2006 | Shaffer et al. | |
| 2001/0049087 A1* | 12/2001 | Hale | 434/350 |
| 2002/0023131 A1 | 2/2002 | Wu et al. | |
| 2002/0062345 A1* | 5/2002 | Guedalia et al. | 709/204 |
| 2002/0071540 A1 | 6/2002 | Dworkin | |
| 2002/0118809 A1* | 8/2002 | Eisenberg | 379/202.01 |
| 2002/0184309 A1 | 12/2002 | Danker et al. | |
| 2003/0088619 A1 | 5/2003 | Boundy | |
| 2003/0126207 A1 | 7/2003 | Creamer et al. | |
| 2003/0177184 A1* | 9/2003 | Dickerman et al. | 709/204 |

OTHER PUBLICATIONS

Spiderphone.com, "Spiderphone Conference Calls", May 11, 2000, available at http://web.archive.org/web/20000511183928/www.spiderphone.com/About/ServiceDescription.asp.*

Jiang, et al., "Integrating Internet Telephony Services," IEEE Internet Computing, May-Jun. 2002, pp. 64-72. XP-002252323.

Shim, et al., "An Example of Using Presence and Availability in an Enterprise for Spontaneous, Multiparty, Multimedia Communications," Internet Telephony Workshop 2001, Apr. 3, 2001.

* cited by examiner

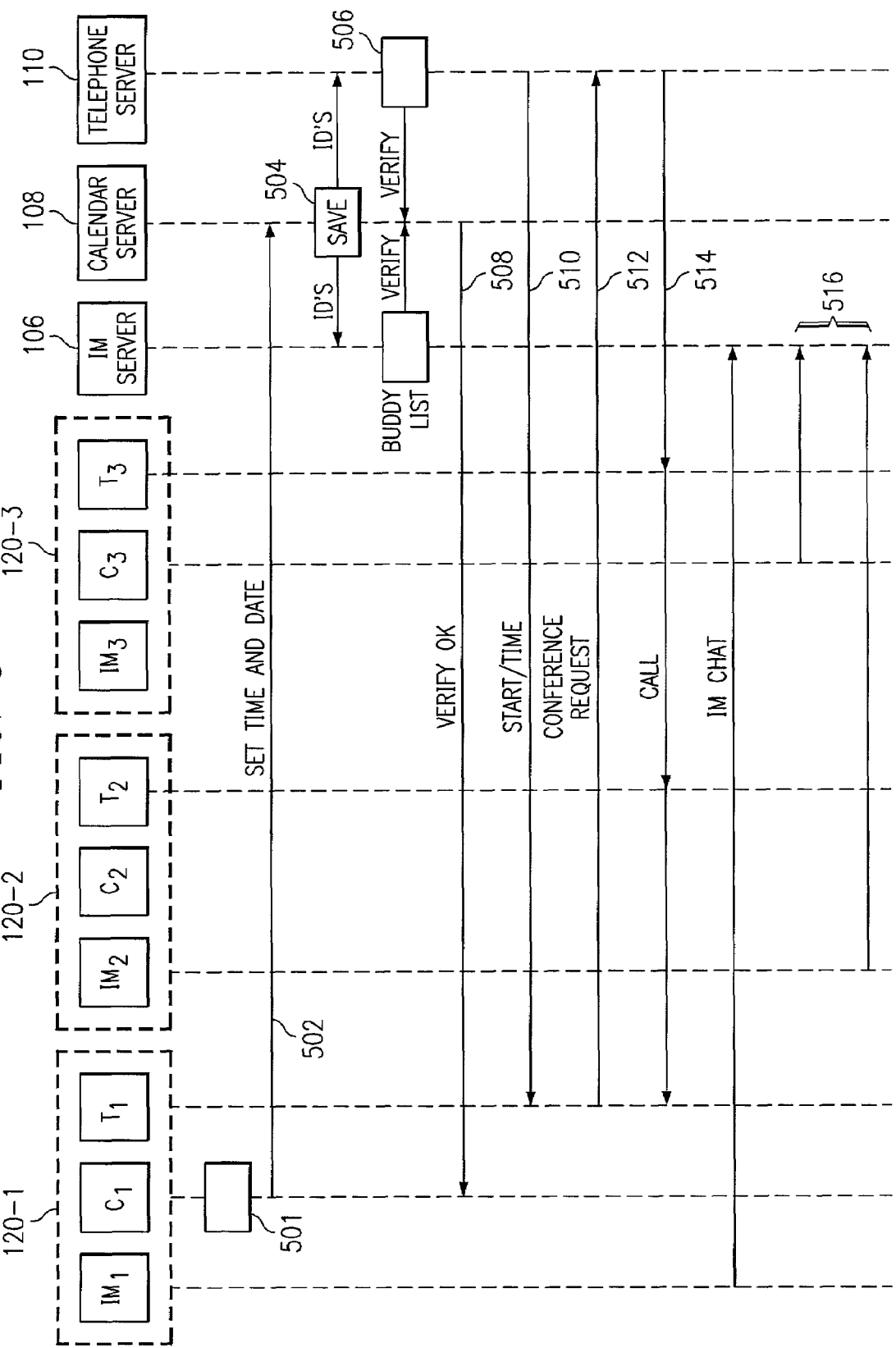

SYSTEM AND METHOD FOR COLLABORATING USING INSTANT MESSAGING IN MULTIMEDIA TELEPHONY-OVER-LAN CONFERENCES

CROSS REFERENCE TO RELATED APPLICATIONS

This application is related to concurrently-filed and commonly-owned patent application Ser. No. 10/174,261, titled "System and Method for Signaling Using Instant Messaging in Multimedia Telephony-over-LAN Conferences."

BACKGROUND OF THE INVENTION

1. Field of the Invention

The present invention relates to telecommunications devices and, in particular, to an improved system and method for multimedia telephony-over-LAN conferences.

2. Description of the Related Art

An effective and user-friendly way to conduct multimedia audio and/or video teleconferences has long been sought. The promulgation of the H.323 Recommendation and the Session Initiation Protocol (SIP), as well as other multimedia packet protocols, have raised hopes that multimedia audio and video conferencing may yet reach their full potentials. Typically, to teleconference using such systems, users must log in to a teleconferencing server, identify themselves as authorized parties, and be scheduled for the conference.

Instant Messaging (IM) allows users to log in to an Instant Messaging server and conduct a text-based "chat" session with groups associated with a user's "buddy" lists. Typically, a user logs in to the server, identifies themselves as being present, uploads a "buddy" list, and then is invited to chat with those on the buddy list.

Telephony systems and instant messaging systems both have advantages and circumstances of use in which one or the other might be more desirable. Typically, telephony systems and instant messaging systems are discrete systems requiring users to learn different sets of procedures for effective usage of each. Further, such systems do not typically allow for cross-system interaction. For example, while a user could establish an instant messaging session with a party while in the middle of a teleconference with that party, the instant messaging session would be wholly independent of the teleconference.

As such, there is a need for a telecommunications system having a greater integration of instant messaging and teleconferencing. There is a still further need for such a system to have a relatively high level of ease of use.

SUMMARY OF THE INVENTION

These and other problems in the prior art are overcome in large part by a system and method according to the present invention.

A method according to an embodiment of the present invention includes scheduling a multimedia teleconference among a plurality of participants; determining which of the users has an instant messaging capability; determining a presence of the instant-messaging capable participants; and connecting the multimedia teleconference using a multimedia IP protocol and an instant messaging session in parallel with at least a subset of the instant-messaging capable teleconference participants.

A telecommunications system according to an embodiment of the present invention includes an instant messaging (IM) server and a VoIP server; and a plurality of system clients having both VoIP and IM sub-clients. The system clients can log on to their respective servers in parallel. The IM server and the VoIP server can communicate lists of common participants and allow for IM conferences among at least subsets of the system clients while an audio or video teleconference is ongoing.

A network system client according to an embodiment of the present invention includes a VoIP sub-client and an Instant Messaging (IM) sub-client. The VoIP sub-client is used to establish multimedia teleconferences, along with a multimedia server. The IM sub-client can be used to establish chat sessions either independently or in conjunction with a multimedia conference. In certain embodiments, IM sub-clients are associated with VoIP sub-clients such that when a multimedia conference is set up, the participants have the option of participating in a chat with at least a subset of the users with IM sub-clients.

A network system client according to an embodiment of the present invention includes a graphical user interface (GUI) for each of a telephony sub-client and an Instant Messaging sub-client. A user may open a window for telephony applications such as teleconferencing and from that window, one or more subsidiary windows for Instant Messaging sessions with parties to the teleconference.

BRIEF DESCRIPTION OF THE DRAWINGS

A better understanding of the invention is obtained when the following detailed description is considered in conjunction with the following drawings in which:

FIG. 8 is a diagram illustrating signaling according to an embodiment of the present invention.

DETAILED DESCRIPTION OF THE INVENTION

Figure 1:
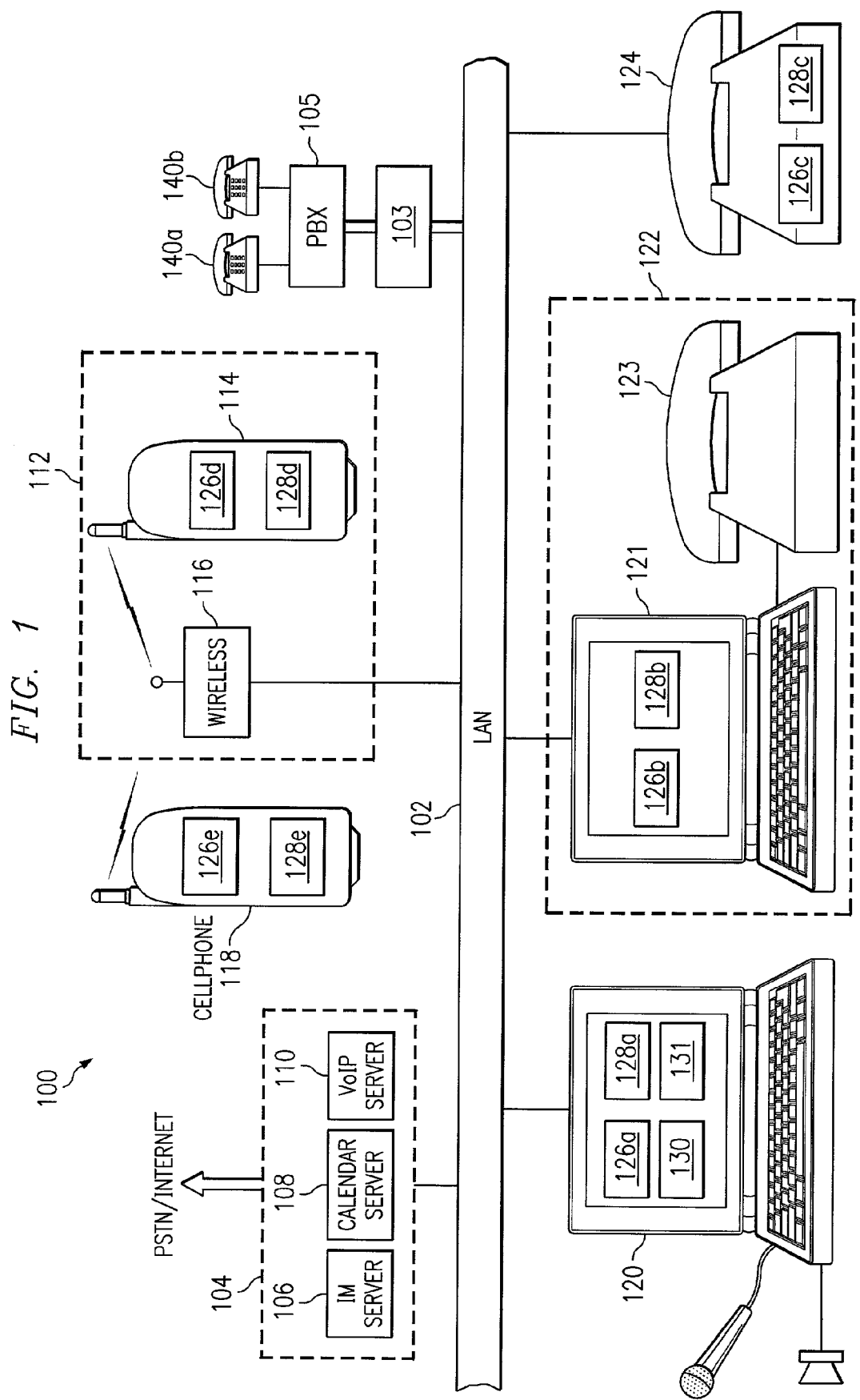
FIG. 1 is a block diagram of a telecommunications system according to an embodiment of the present invention.

Turning now to the drawings and, with particular attention to FIG. 1, a diagram of a telecommunications system 100 according to an embodiment of the present invention is shown. The telecommunications system 100 includes a packet network such as a LAN 102 to which are coupled a plurality of network devices. In particular, shown are a server 104, which includes an Instant Messaging server 106, a calendar server 108, and a telephony server 110. In the embodiment illustrated, the server 104 couples to the Public Switched Telephone Network (PSTN) or Internet. The server 104 may also include gateway and gatekeeper, as well as multipoint control unit functionality. It is noted that, while a single server 104 is shown, the server functionality may also be implemented using a plurality of individual servers coupled to the LAN 102. Thus, the figures are exemplary only.

The telecommunications system also includes a plurality of network clients, which may be implemented in a variety of configurations. For example, shown are a wireless telephone 112, including a cordless base station 116 and a handset 114; a cellular telephone 118, which couples in through a cellular network (not shown) and the PSTN; a LAN telephone 124; a computer 120 implementing a telephony application program; and a network client 122 implementing a CTI (computer-telephony integration) type system, including a computer 121 and a coupled telephone 123.

Figure 2:
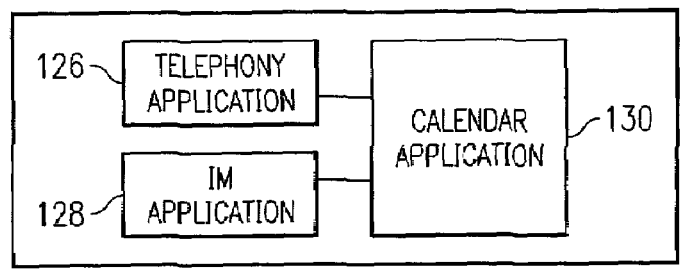
FIG. 2 is a block diagram of an exemplary telecommunications client according to an embodiment of the present invention.

The network clients 120, 122, 124, 118, 112 implement telephony sub-clients 126a-126e, respectively, and Instant Messaging sub-clients 128a-128e, respectively, as will be explained in greater detail below. More particularly, as shown in FIG. 2, each illustrated network client includes a telephony sub-client 126, an Instant Messaging sub-client 128, and a calendaring application 130. A client 120 may also implement a graphical user interface 131. In operation, the telephony sub-client or application 126 provides telephone functionality according to the appropriate standard for each device, e.g., an IP telephony standard for transmittal on the LAN 102. For example, in some embodiments, the telephony sub-clients 126 implement the H.323 Recommendation or the Session Initiation Protocol (SIP), although other packet multimedia protocols may be employed. The Instant Messaging sub-clients 128 implement an appropriate Instant Messaging standard. As noted above, suitable Instant Messaging standards include the Netscape AOL Instant Messenger, AT&T Instant Messenger, Yahoo! Pager, or Microsoft Instant Messenger. The calendar application 130 functions with the calendaring server 108, such as Microsoft Exchange server, to schedule teleconferences and chat sessions, as will be explained in greater detail below. Suitable calendar software includes Microsoft Outlook.

Also coupled to the LAN 101 may be a telephony feature access server or device 103 which couples the LAN 101 to a PBX 105, such as a Hicom PBX. A variety of PBX telephony devices 140a, 140b may also couple to the PBX 105. Devices on the network 102 may be configured to obtain their telephony services through the PBX 105 via the TFA 103. An exemplary telephony feature access server is the Hicom Feature Access server, available from Siemens Corp., and employing the Cornet protocol. In certain embodiments, the TFA 103 may be equipped with Instant Messaging, calendaring, and VoIP capabilities in accordance with the present invention, either as a server or a network device. In what follows, for sake of simplicity, the description will focus primarily on the server 104, it being understood that the teachings of the present invention are equally applicable to the TFA 103.

Figure 3A:
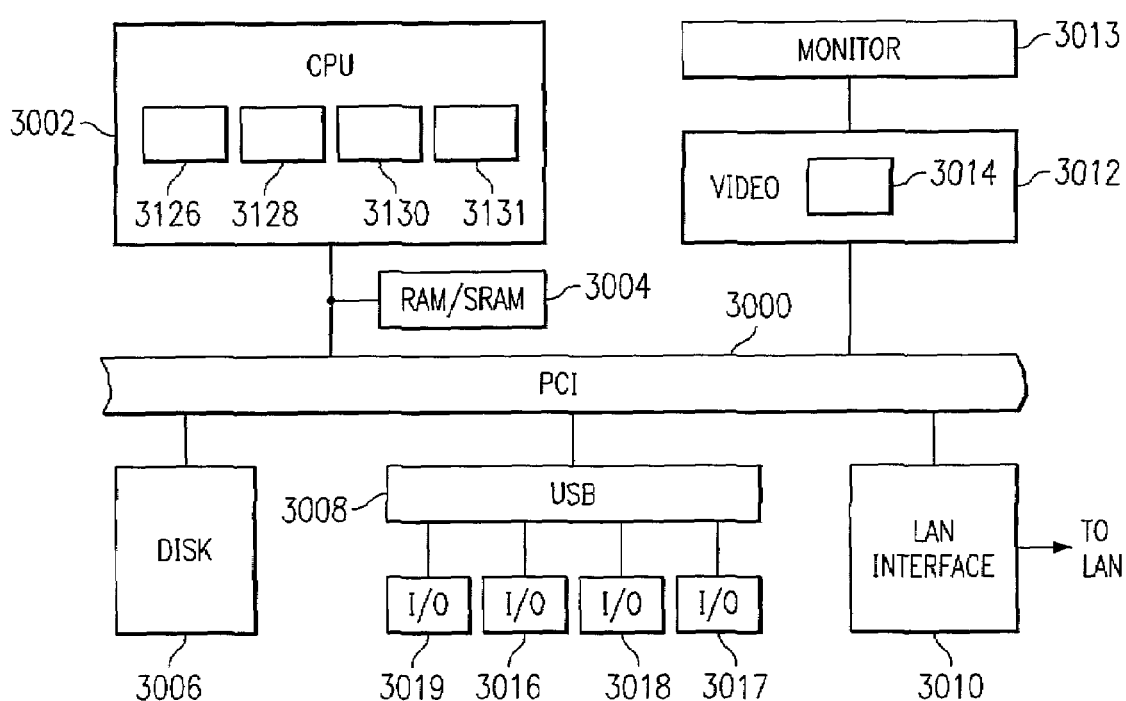
FIG. 3A and FIG. 3B are more detailed block diagrams of telecommunications clients according to embodiments of the present invention.
Figure 3B:
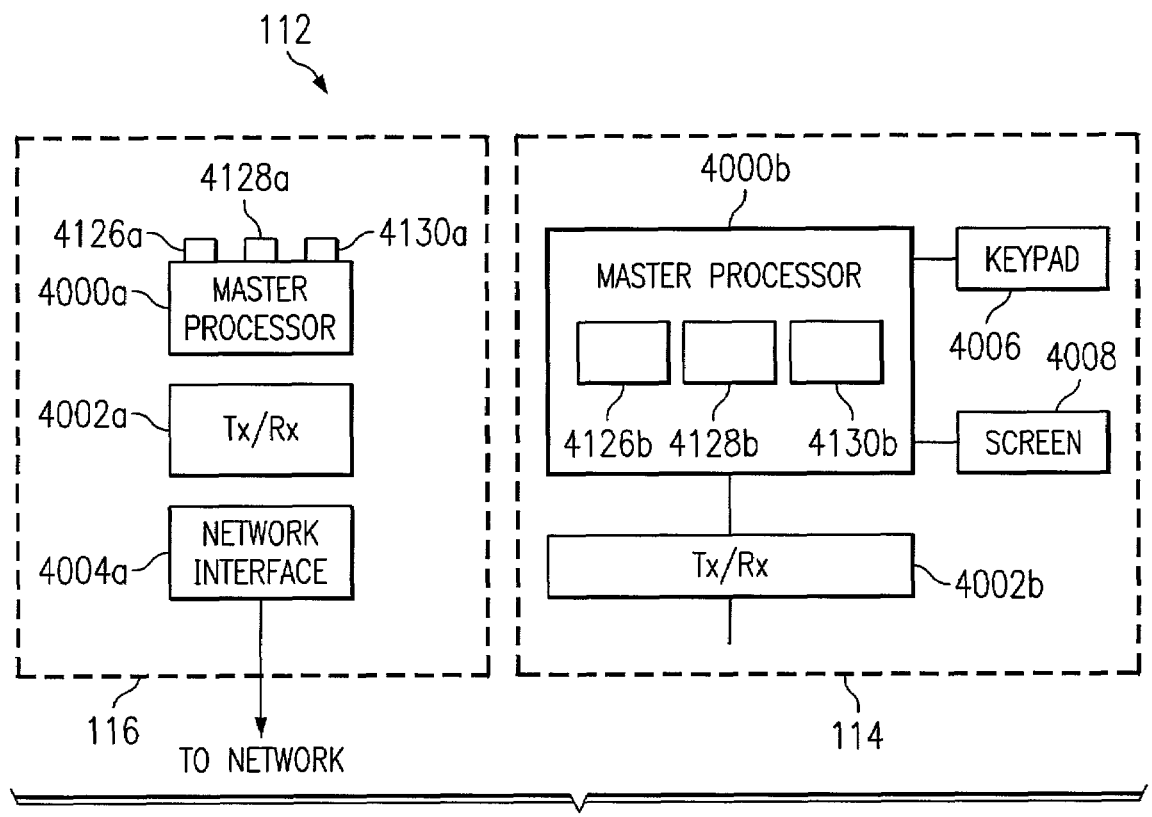

FIG. 3A and FIG. 3B are block diagrams of exemplary network clients according to embodiments of the present invention. In particular, the client 120 of FIG. 3A is exemplary of a personal computer coupled to the network via a network interface card (or wireless network interface card). As shown, the network client 120 includes a bus 3000, such as a PCI bus. Coupled to the bus 3000 are one or more processors 3002; memory 3004, such as RAM or SRAM; a disk drive 3006; one or more Universal Serial Bus interfaces 3008; a video interface 3012; and a LAN interface 3010.

The processor 3002 may be implemented as any of a variety of processors or controllers, including one or more x86 or Pentium-type processors and/or one or more digital signal processors. The processor 3002 implements an IM client 3126, a telephony client 3128, and a calendar client 3130, according to the present invention. The software for implementing the clients may be stored on the disk drive 3006 and memory 3004 in a known manner. The video interface 3012 may couple to a monitor 3013 and display a graphical user interface 3014 executable by the processor 3002 for use with the software clients. The USB interface(s) 308 interface to I/O devices, such as microphone 3016, speaker(s) 3018 and a keyboard 3017 and/or cursor input device 3019. The processor may also implement a graphical user interface 3131, as will be described in greater detail below.

Finally, as noted above, a network interface 3010 interfaces the network client to a network, such as a local area network (LAN). The network interface 3010 may be implemented as a wireless or wired interface. It is noted that the network client 122 (FIG. 1) is generally similar, though the telephone functionality is provided by the coupled telephone 123 rather than the software client.

FIG. 3B illustrates another embodiment of the network client and, particularly, a wireless client 112. The wireless client 112 may be embodied, for example, as any wireless telephone system, including a DECT system or other system functioning, for example, in the 2.4 GHz range. The network client 112 includes a base station 116 and one or more handsets or portable units 114. For convenience, only one such handset 114 is shown.

The base station 116 includes a master processor 4000a, a transceiver 4002a, and a network interface 4004a. In certain embodiments, both the base station 114 and the handset 116 may be used to make telephone calls. Thus, the master processor may implement an IM client 4126a, a telephony client 4128a, and a calendar client 4130a according to embodiments of the present invention. Typically, the clients are implemented as programs stored in memory (not shown). In such an embodiment, the base station 114 will also include a display (not shown), such as an LCD display, and a keypad (not shown). In other embodiments, the base station 114 is not used directly for user interaction and thus does not include a display or full IM client, telephony client and calendar client functionality.

The transceiver 4002a functions to implement coding and decoding and generally to communicate with the handsets 114. The network interface 4004a interfaces the network client 112 to the network. Thus, the network interface may be a local area network interface.

The handset 114 includes a master processor 4000b, a transceiver 4002b, a keypad 4006, and a display 4008. It is noted that in certain embodiments, the keypad is implemented as a "virtual" touch screen on the display 4008. Thus the figure is exemplary only. The display is used to implement a graphical user interface for IM, telephony and calendar functionality, as will be explained in greater detail below.

The master processor 4000b includes a IM client 4126b, a telephony client 4128b, and a calendar client 4130b, as will be explained in greater detail below. Typically, the clients are implemented as programs stored in memory (not shown).

As will be explained in greater detail below, in operation, the user can use the keypad and screen 4006, 4008 to set a date and parties for a conference. The network server 104 then acts to set up and coordinate the conference It is noted that a cellular telephone or PDA 118 according to embodiments of the present invention is configured generally similarly. Typical cellular telephone standards include GSM and IS-136 TDMA.

Figure 4:
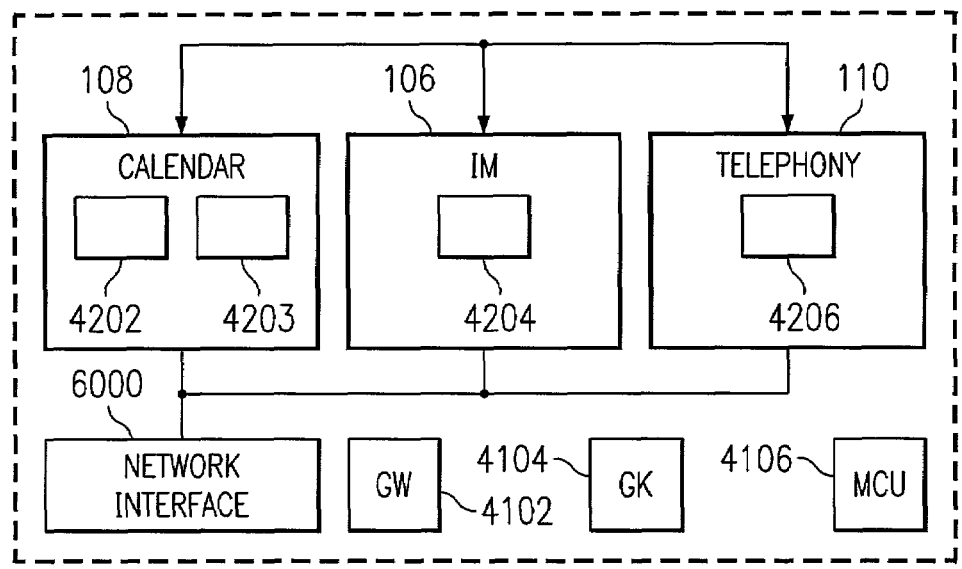
FIG. 4 is a block diagram of an exemplary telecommunications server according to an embodiment of the present invention.

FIG. 4 is a block diagram of an exemplary network server according to an embodiment of the present invention. As shown, the server includes an IM server 106, a calendar server 108, and a telephony server 110. The server further includes on or more network interfaces 6000 for interfacing the servers to the local area network.

The calendar server 108 implements a central calendar application 4202 which is used to schedule teleconferences from network clients. The calendar server 108 thus further includes a memory 4203 for storing configuration information, such as lists of clients, and times of conferences, including the appropriate parties. In operation, the calendar application 4202 receives a request for a conference and stores the date and parties in the memory. The conference is then communicated to the IM server 106 and the telephony server 110.

The IM server 106 likewise includes a memory 4204 for storing configuration information and for receiving "buddy" lists from IM clients. In operation, the IM client activates chat sessions among at least a subset of the parties to the teleconference, in some embodiments, receiving messages and retransmitting them to other chat parties.

The telephony server 110 also includes a memory 4206 for storing configuration information and calling and called party information. In operation, the telephony server receives the conference appointment time from the calendar server 108 and, at the appointed time, either arranges the system for the conference or transmits a request to the host user to begin the conference.

In addition, the server may include gateway 4102 and gatekeeper functionality 4104 (in an embodiment employing H.323), as well as multipoint control unit (MCU) 4106 functionality. Finally, while illustrated as a single server, each of the IM server, calendar server, and the telephony server, and the various other components, could be implemented as discrete units. Thus, the figure is exemplary only.

Operation of an embodiment of the present invention is explained with reference to FIG. 5 and FIG. 6. In the discussion that follows, network client 120 shall be referred to, it being understood that the teachings of the present invention are equally applicable to the other network clients and their functionality generally similar.

Figure 5:
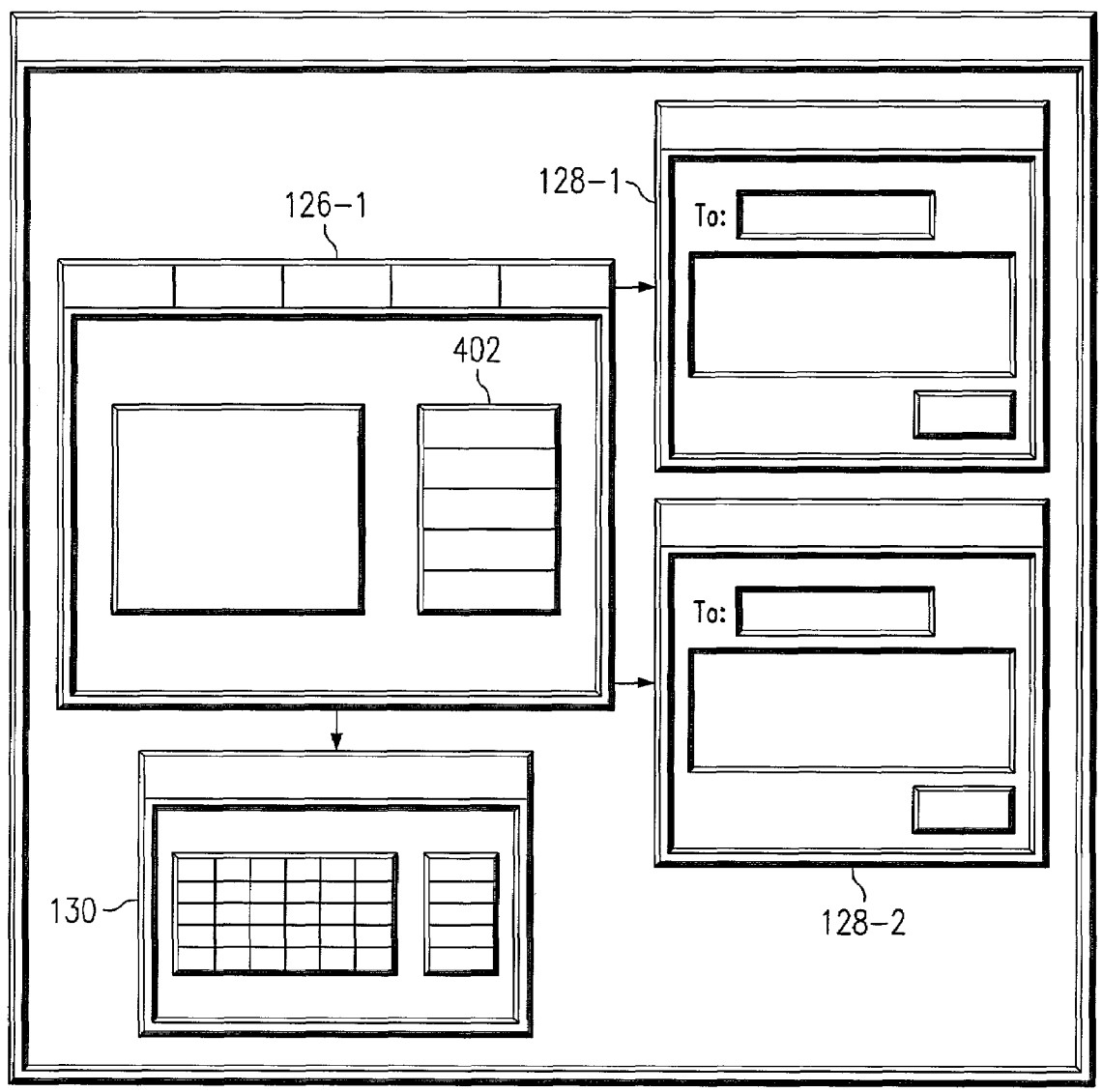
FIG. 5 is a diagram illustrating an exemplary graphical user interface according to an embodiment of the present invention.

As shown in FIG. 5, the telephony client 126, the instant messaging client 128, and the calendar application 130 may be implemented including a graphical user interface. In operation, the user may activate one or more instant messaging windows 128-1, 128-2 and one or more calendar windows 130. In a typical embodiment, the calendar application 130 and the instant messaging windows 128-1, 128-2 are opened from within the telephony application 126-1. Thus, these applications may form an integrated part of the telephony application, or may be implemented using plug-ins. In other embodiments, these applications may be implemented using separate applications that are nonetheless adapted to communicate with one another. In still other embodiments, the calendar application or the instant messaging applications may be opened first, and the other applications from them. In the embodiment illustrated, the application further includes an address book or buddy list 402.

Figure 6:
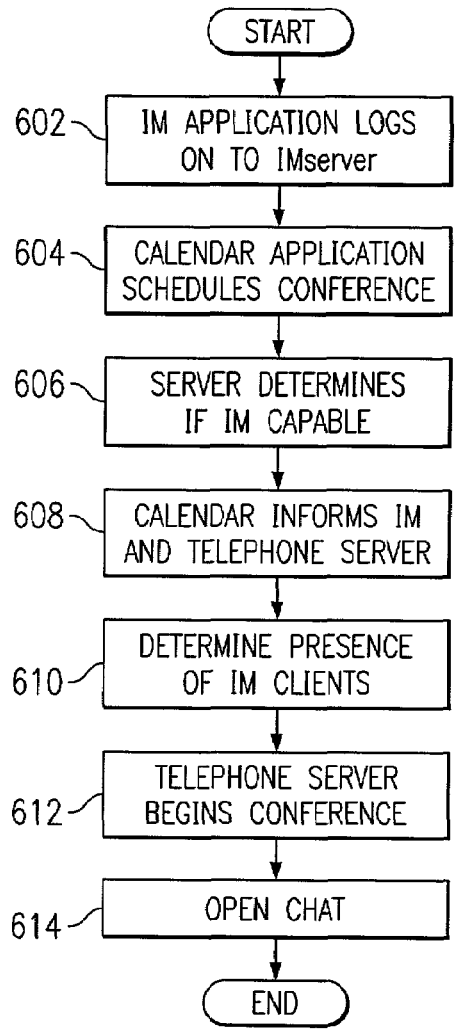
FIG. 6 is a flow diagram illustrating operation of an embodiment of the present invention.

FIG. 6 is a flow diagram illustrating operation of an embodiment of the present invention. As shown, in 602, the IM application 128 is used to log on and provide a buddy list to the IM server 106. In 604, the calendar application 130 is used to schedule a teleconference using the calendar server 108. For example, the user may set a date and identify the parties to the teleconference, and the parties may be informed of the time of the conference. At 606, the server determines if the parties to the teleconference have IM capability. It is noted that in certain embodiments, the party information may be handed off to the IM server 106 or the telephony server 110 for them to make this determination. In 608, the calendar server 108 informs the IM server and the telephony server of the conference. This can occur at or before the scheduled time of the conference; and may occur before step 606. At 610, the IM server determines a presence of IM clients, at the time of the conference. At 612, the telephony server 110 begins the conference by calling all parties, i.e., by communicating with the telephone clients. At 614, the chat channels are opened.

It is noted that, in certain embodiments, at the time of the conference, the party who called the conference may be contacted by the calendar server (e.g., via a pop up message box) and given the option of starting the conference or delaying it (i.e., if not all participants are present.).

Figure 7:
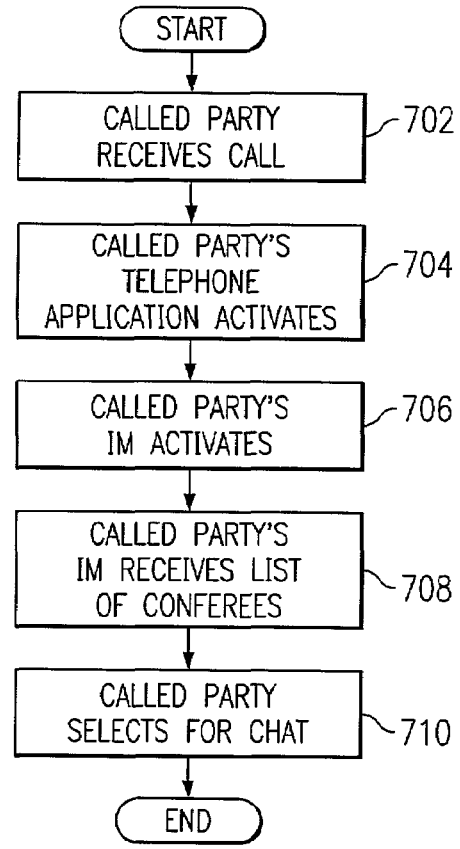
FIG. 7 is a flow diagram illustrating operation of an embodiment of the present invention.

FIG. 7 is a flowchart illustrating handling when a user or network client receives a conference call in embodiments of the present invention. In a step 702, the called party receives the call, i.e., a call request and call setup signaling. In step 704, the called party's telephony application activates and proceeds with appropriate handshake signaling to establish the call. In step 706, the called party's IM application activates. For example, this may occur automatically, or the called party may manually click on an associated IM icon. In 708, the called party's IM application receives the list of participants to the conference. Finally, in step 708, the called party can select from the list to establish a chat session with various of the participants.

Turning now to FIG. 8, a diagram illustrating operation of an embodiment of the invention in greater detail is shown. Shown are a plurality of network clients 120-1, 120-2, 120-3, an IM server 106, a calendar server 108, and a telephony server 110. The network client 120-1 includes an IM application IM1, calendar application C1, and telephony application T1; the network client 120-2 includes an IM application IM2, calendar application C2, and telephony application T2; and the network client 120-3 includes an IM application IM3, calendar application C3, and telephony application T3.

In the example illustrated, it is assumed that the conference is set up at the behest of the user of network client 120-1. Initially, at 501, the user at network client 120-1 activates his calendar application C1 to set a time and date for the teleconference. As noted above, any calendar application may be used. One such application is Microsoft Outlook. At 502, the time and date are then uploaded to the calendar server 108. A suitable calendar server is the Microsoft Exchange server.

In certain embodiments, the identity of the other parties to the conference is also uploaded to the server. Thus, in 504, the calendar server 108 saves the time, date and the party information. At 506, the IM server 106 and the telephony server 110 may verify the parties identified.

Next, in 508, the calendar server 108 sends an acknowledgement to the calendar application C1 that set the conference. At 510, the calendar server 108 sends a message to the network client at the conference time, indicating that the conference is to begin. In response, at 512, the telephony client T1 sends a conference request message to the telephony server 110. At 514, the telephony server responds to set up the call to the originator and the other telephony clients T2, T3. The teleconference would typically be implemented in a multicast mode. The instant messaging client IM1 then logs on to the instant messaging server 106, at 514. Then, at 516, the other instant messaging applications of parties to the conference log in. The users are then able to maintain a chat session with other parties while the teleconference is ongoing.

It is noted that, in certain embodiments, the calendar application C1 informs the other applications IM1 and T1 of the time and scheduling of the conference. The telephony application T1 and the IM client IM1 then begin the conference at the appointed time.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising:
   scheduling a multimedia conference among a plurality of users using a calendar application, scheduling including a scheduled conference time and listing conference participants;
   notifying a telephony server of the multimedia conference at said scheduled conference time, said calendar application providing said telephony server with notification, the telephony server selectively initiating the multimedia conference, the multimedia conference being selectively initiated by transmitting a request to an identified host user to begin the multimedia conference;
   determining, responsive to said scheduling, which of said listed conference participants has an Instant Messaging capability;
   determining a presence of those of said listed conference participants determined to have Instant Messaging capability at a time of a multimedia conference; and
   connecting said multimedia conference responsive to the initiating using a multimedia packet protocol via said telephony server calling the listed conference participants and establishing a subsequent parallel Instant Messaging session via an IM server among at least a subset of said listed conference participants determined to have Instant Messaging capabilities and be present based on said determining a presence, said establishing a subsequent parallel Instant Messaging session including communicating one or more lists of common listed conference participants from the telephony server to the IM server.

2. A telecommunications method in accordance with claim 1, wherein said scheduling comprises a multimedia conference server communicating with a calendaring server and identifying said listed conference participants to said multimedia conference.

3. A telecommunications method in accordance with claim 2, wherein said determining an Instant Messaging capability comprises an Instant Messaging server communicating an Instant Messaging user identification with said multimedia conference server.

4. A telecommunications method in accordance with claim 3, wherein said determining an Instant messaging user presence comprises correlating said Instant Messaging user identification with an identification of a multimedia conference participant at a time of said conference.

5. A telecommunications method in accordance with claim 4, wherein said multimedia sewer implements a protocol compliant with at least one of the H.323 Recommendation or the Session Initiation Protocol.

6. A telecommunications method in accordance with claim 5, wherein said Instant Messaging capabilities are implemented using AOL Instant Messaging.

7. A telecommunications system, comprising:
   a packet network;
   a plurality of network clients operably coupled to said network, said network clients including a plurality of telephony clients and an associated plurality of Instant Messaging clients and at least one calendar application, at least one network client of said plurality of network clients being one of said plurality of telephony clients and of said associated plurality of Instant Messaging clients and including one said at least one calendar application, all three in communication with one another;
   a teleconferencing server operably coupled to said packet network and configured to schedule a teleconference among said plurality of network clients responsive to a scheduling using the calendar application, said scheduling including a scheduled conference time and listing conference participants, the teleconferencing server configured to selectively initiate the teleconference, the teleconference being selectively initiated by transmitting a request to an identified host user to begin the teleconference and calling the telephony clients at the scheduled time responsive to notification from the calendar application of listed teleconference participants and the scheduled time; and
   an Instant Messaging server operably coupled to said packet network;
   wherein said teleconferencing server and said Instant Messaging server are adapted to interface such that one or more subsequent Instant Messaging sessions are implementable and established in parallel among listed teleconference participant users of said network clients determined to have Instant Messaging capability responsive to said notification and participating in a scheduled teleconference being serviced by said teleconferencing server once the teleconference has begun said establishing said subsequent parallel Instant Messaging sessions including communicating one or more lists of common listed conference participants from the teleconferencing server to the IM.

8. A telecommunications system in accordance with claim 7, said network clients comprising a common interface for implementing said telephony clients and said Instant Messaging clients.

9. A telecommunications system in accordance with claim 7, wherein selectively initiating further comprises automatically initiating the teleconference at the scheduled time, said telecommunications system further comprising a calendaring application for initiating an Instant Messaging session while a telephony session is ongoing.

10. A telecommunications system in accordance with claim 9, wherein said calendaring application comprises a calendar server.

11. A telecommunications system in accordance with claim 7, said network clients comprising a telephone operably coupled to a computer, said computer implementing said Instant Messaging client and an interface to said telephone.

12. A telecommunications system in accordance with claim 7, said network clients comprising a personal computer implementing a telephony application, a calendar application and Instant Messaging software, Instant Messaging windows and said calendar application opening within said telephony application.

13. A telecommunications system in accordance with claim 7, said network clients comprising a wireless device implementing said telephony clients and said Instant Messaging clients.

14. A telecommunications system in accordance with claim 13, wherein said telephony clients implement at least one or Session Initiation Protocol (SIP) or H.323.

15. A telecommunications system in accordance with claim 7, wherein said Instant Messaging clients implement AOL Instant Messenger.

16. A telecommunications system in accordance with claim 7, further including:
   a telephony feature access device coupled to the network; and a private branch exchange coupled to the telephony feature access device.

17. A telecommunications system in accordance with claim 7, wherein at least one network client of said plurality of network clients comprises:

a multimedia packet network client;

an Instant Messaging client;

a calendar client for scheduling a multimedia conference, said multimedia packet network client, said Instant Messaging client and said calendar client being in communication with one another; and a graphical user interface (GUI) adapted to schedule, implement and establish a subsequent parallel Instant Messaging (IM) session from a program implementing said multimedia packet client during a scheduled multimedia packet telephony session and make a determination responsive to the scheduling that a conferencing multimedia packet telephony client is Instant Messaging capable, said determination including receiving from an Instant Messaging service a list of Instant Messaging capable clients and receiving a list of telephony clients received from a teleconferencing server;

wherein the device is configured to join the multimedia packet telephony session in response to a call from a teleconferencing server at the scheduled time of the session, joining said multimedia packet telephony session including said multimedia packet network client selectively establishing said subsequent parallel IM session.

18. A telecommunications device in accordance with claim 17, wherein said graphical user interface comprises a plug-in in said program implementing said multimedia packet client.

19. A telecommunications device in accordance with claim 18, wherein said multimedia packet network client implements at least one of H.323 Recommendation protocol or Session Initiation Protocol; and selectively establishing comprises joining an active IM session and initiating an IM session whenever Instant Messaging is inactive.

20. A telecommunications device in accordance with claim 19, wherein said Instant Messaging client implements AOL Instant Messenger, said Instant Messaging client and said calendar client opening within said multimedia packet network client.

* * * * *